(12) United States Patent
Kim et al.

(10) Patent No.: US 9,031,147 B2
(45) Date of Patent: May 12, 2015

(54) MULTI-LINK WIRELESS CHANNEL SOUNDER AND MULTI-LINK WIRELESS CHANNEL MEASUREMENT METHOD THEREOF

(75) Inventors: Myung-Don Kim, Daejeon (KR); Jae-Joon Park, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 299 days.

(21) Appl. No.: 13/333,728

(22) Filed: Dec. 21, 2011

(65) Prior Publication Data

US 2012/0155516 A1      Jun. 21, 2012

(30) Foreign Application Priority Data

Dec. 21, 2010    (KR) .......................... 10-2010-0131581

(51) Int. Cl.
| | |
|---|---|
| H04L 25/02 | (2006.01) |
| H04W 24/00 | (2009.01) |
| H04W 24/10 | (2009.01) |
| H04W 48/16 | (2009.01) |
| H04W 88/06 | (2009.01) |

(52) U.S. Cl.
CPC ........... *H04L 25/0206* (2013.01); *H04W 24/00* (2013.01); *H04W 24/10* (2013.01); *H04W 48/16* (2013.01); *H04W 88/06* (2013.01); *H04L 25/0224* (2013.01)

(58) Field of Classification Search
USPC .......................... 375/267, 260, 299, 347, 349
See application file for complete search history.

(56) References Cited

U.S. PATENT DOCUMENTS

| | | | | |
|---|---|---|---|---|
| 2007/0149238 | A1* | 6/2007 | Das et al. ....................... | 455/522 |
| 2008/0109711 | A1* | 5/2008 | Morioka et al. ............... | 714/807 |
| 2009/0040960 | A1  | 2/2009 | Kim et al. | |
| 2009/0232113 | A1* | 9/2009 | Tamaki ......................... | 370/337 |
| 2010/0074301 | A1* | 3/2010 | Howard et al. ................ | 375/130 |
| 2010/0099366 | A1* | 4/2010 | Sugar et al. ..................... | 455/75 |

FOREIGN PATENT DOCUMENTS

| | | |
|---|---|---|
| EP | 1 850 509 A1 | 10/2007 |
| EP | 2 079 209 A1 | 7/2009 |
| JP | 2007-295569 A | 11/2007 |
| KR | 1020050117127 B1 | 12/2005 |

\* cited by examiner

*Primary Examiner* — Kabir A Timory

(57) ABSTRACT

A multi-link wireless channel sounder is provided. The multi-link wireless channel sounder includes a multi-input multi-output (MIMO) antenna unit, a transmitter (TX) signal processing unit configured to transmit via the MIMO antennas one or more TX wireless channel signals to be transmitted via a wireless channel, a receiver (RX) signal processing unit configured to receive and process one or more RX wireless channel signals that are received from multiple links via the MIMO antenna unit, and a control unit configured to receive an operation mode selection signal that indicates a TX mode or an RX mode from a user and to control the TX signal processing unit or the RX signal processing unit to operate selectively in accordance with the operation mode selection signal.

17 Claims, 9 Drawing Sheets

MULTI-LINK WIRELESS CHANNEL SOUNDER AND MULTI-LINK WIRELESS CHANNEL MEASUREMENT METHOD THEREOF

CROSS-REFERENCE TO RELATED APPLICATION(S)

This application claims the benefit under 35 U.S.C. §119 (a) of Korean Patent Application No. 10-2010-0131581, filed on Dec. 21, 2010, in the Korean Intellectual Property Office, the entire disclosure of which is incorporated herein by reference for all purposes.

BACKGROUND

1. Field

The following description relates to a mobile communication system, and more particularly, to a wireless channel sounder that analyzes the characteristics of the wireless channels, and that performs spatial channel modeling based on the results of the analysis.

2. Description of the Related Art

Mobile communication technologies are being evolved to combine transmission diversity and multi-user diversity and to provide cooperative communications to increase the transmission capacity of mobile communication systems. Cooperative mobile communication is a technique for the design and embodiment of next-generation mobile communication networks in which multiple links exist in a complex manner, and have attracted public attention as a suitable mobile communication technique to improve wireless transmission capacity using base stations (BSs), mobile stations (MSs), and relay stations (RSs), remove wireless dead zone areas, and expand the cell coverage of mobile communication devices.

Cooperative mobile communication involves using a wireless communication system that is equipped with multiple input multiple output (MIMO) antennas, and whose performance varies depending on the spatial characteristics of MIMO channels that vary constantly over time. That is, a wireless communication system equipped with MIMO antennas may be more sensitive than a wireless communication system equipped with single input single output (SISO) antennas to the characteristics of wireless channels. Thus, it is important to precisely determine the characteristics of wireless channels for the design of a wireless communication system with MIMO antennas.

Next-generation wireless communication systems using MIMO antennas may be used in urban areas, and particularly, in an indoor environment for high-speed wireless data transmission. To develop a next-generation mobile communication system such as, for example, an IMT-Advanced system, the analysis and mathematical modeling of the propagation characteristics of spatial channels including MIMO channels in wireless interface area may be required. Since the characteristics of wireless channels vary depending on a frequency band, the characteristics of the ground and features on the ground, and the climate, it is necessary to perform wireless channel measurement in various environments and acquire and analyze precise wireless channel measurement data for a reliable wireless channel modeling.

Conventional MIMO antenna wireless channel measurement apparatuses, which are also referred to as channel sounders, are unidirectional measurement systems including a transmitter (TX) system and a receiver (RX) system. To perform wireless channel measurement in urban areas (such as, for example, urban macro or urban micro areas) or areas with complicated traffic patterns, a TX system and TX MIMO antennas may be installed at a BS building or a steel tower that stand higher than neighboring buildings, and an RX system and RX MIMO antennas may be installed at a vehicle that is on the move along a predetermined route. This type of wireless channel measurement is characterized by performing wireless channel measurement and collecting wireless channel measurement data along the path of movement of the vehicle.

However, there is a limit in measuring all the links between BSs, MSs, and RSs in a next-generation mobile communication network where complex multiple links exist by using a conventional channel sounder. For a statistically reliable wireless channel modeling, a considerable number of sample data needs to be collected from a variety of environments. However, conventionally, wireless channel measurement may need to be performed as many times as there are links to be measured, which is extremely inconvenient, time-consuming and costly.

That is, to collect wireless channel measurement data from a complex mobile communication network and model the characteristics of wireless channels, each link in the complex mobile communication network may need to be measured more several times. However, this type of wireless channel measurement may not be suitable for collecting wireless channel measurement data from an environment in which the characteristics of wireless channels continue to vary.

SUMMARY

The following description relates to a multi-link wireless channel sounder capable of performing wireless channel measurement in a mobile communication network where complex multiple links exist and a multi-link wireless channel measurement method thereof.

The following description also relates to a multi-link wireless channel sounder capable of reducing the time and cost of wireless channel measurement and a multi-link wireless channel measurement method thereof.

The following description also relates to a multi-link wireless channel sounder capable of improving the precision and reliability of wireless channel measurement data and a multi-link wireless channel measurement method thereof.

In one general aspect, there is provided a multi-link wireless channel sounder, including: a multi-input multi-output (MIMO) antenna unit; a transmitter (TX) signal processing unit configured to transmit via the MIMO antennas one or more TX wireless channel signals to be transmitted via a wireless channel; a receiver (RX) signal processing unit configured to receive and process one or more RX wireless channel signals that are received from multiple links via the MIMO antenna unit; and a control unit configured to receive an operation mode selection signal that indicates a TX mode or an RX mode from a user and to control the TX signal processing unit or the RX signal processing unit to operate selectively in accordance with the operation mode selection signal.

In another general aspect, there is provided a wireless channel measurement method of a multi-link wireless channel sounder that operates in a TX mode or an RX mode, the wireless channel measurement method including: setting the multi-link wireless channel sounder to the TX mode in response to a control signal being received from a user; and transmitting one or more codes to be measured to another multi-link wireless channel sounder that is set to the RX mode at a predefined TX timing.

In another general aspect, there is provided a wireless channel measurement method of a multi-link wireless channel sounder that operates in a TX mode or an RX mode, the wireless channel measurement method including: setting the multi-link wireless channel sounder to the RX mode in response to a control signal being received from a user; and sequentially measuring one or more signals that are received from two or more other multi-link wireless channel sounders that are set to the TX mode.

Other features and aspects may be apparent from the following detailed description, the drawings, and the claims.

Figure 1:
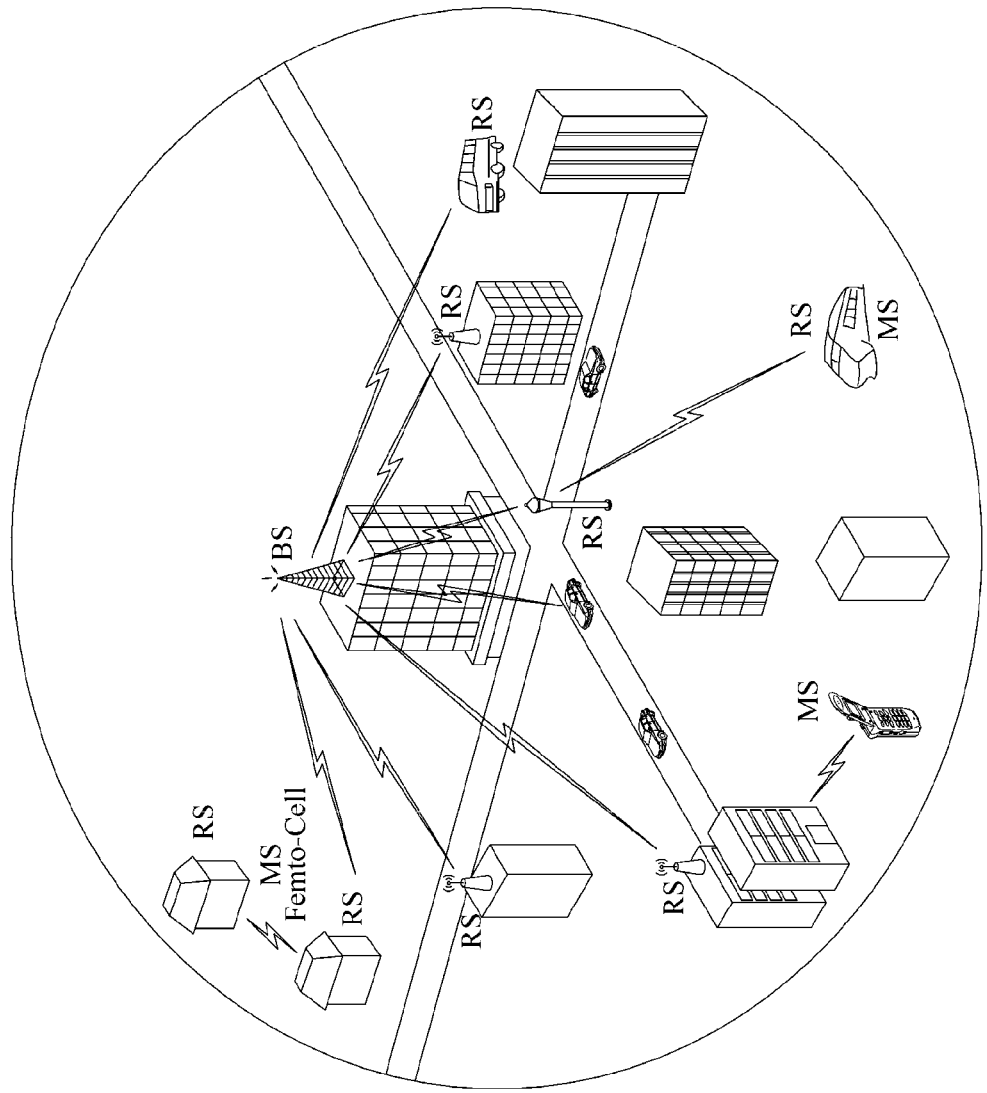
FIG. 1 is a diagram illustrating an example of a complex mobile communication network.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Various aspects are directed to a multi-link wireless channel sounder capable of measuring a plurality of wireless channels at the same time in a mobile communication environment in which complex multiple links exist, and a multi-link wireless channel measurement method thereof. Various aspects are also directed to a multi-link wireless channel sounder capable of being disposed at a transmitter (TX) or a receiver (RX) and being switched to a TX mode or an RX mode accordingly so as to measure a plurality of wireless channels according to any given timing variables and a multi-link wireless channel measurement method thereof.

FIG. 1 illustrates an example of a complex mobile communication network.

Referring to FIG. 1, a complex mobile communication network may be configured to include a plurality of base stations (BSs), a plurality of mobile stations (MSs), and a plurality of relay stations (RSs) that connect the BSs and the MSs. In the complex mobile communication network, a plurality of links may exist. To efficiently measure the wireless channel state of each of the plurality of links, a multi-link wireless channel sounder and a multi-link wireless channel measurement method thereof may be provided.

Figure 2:
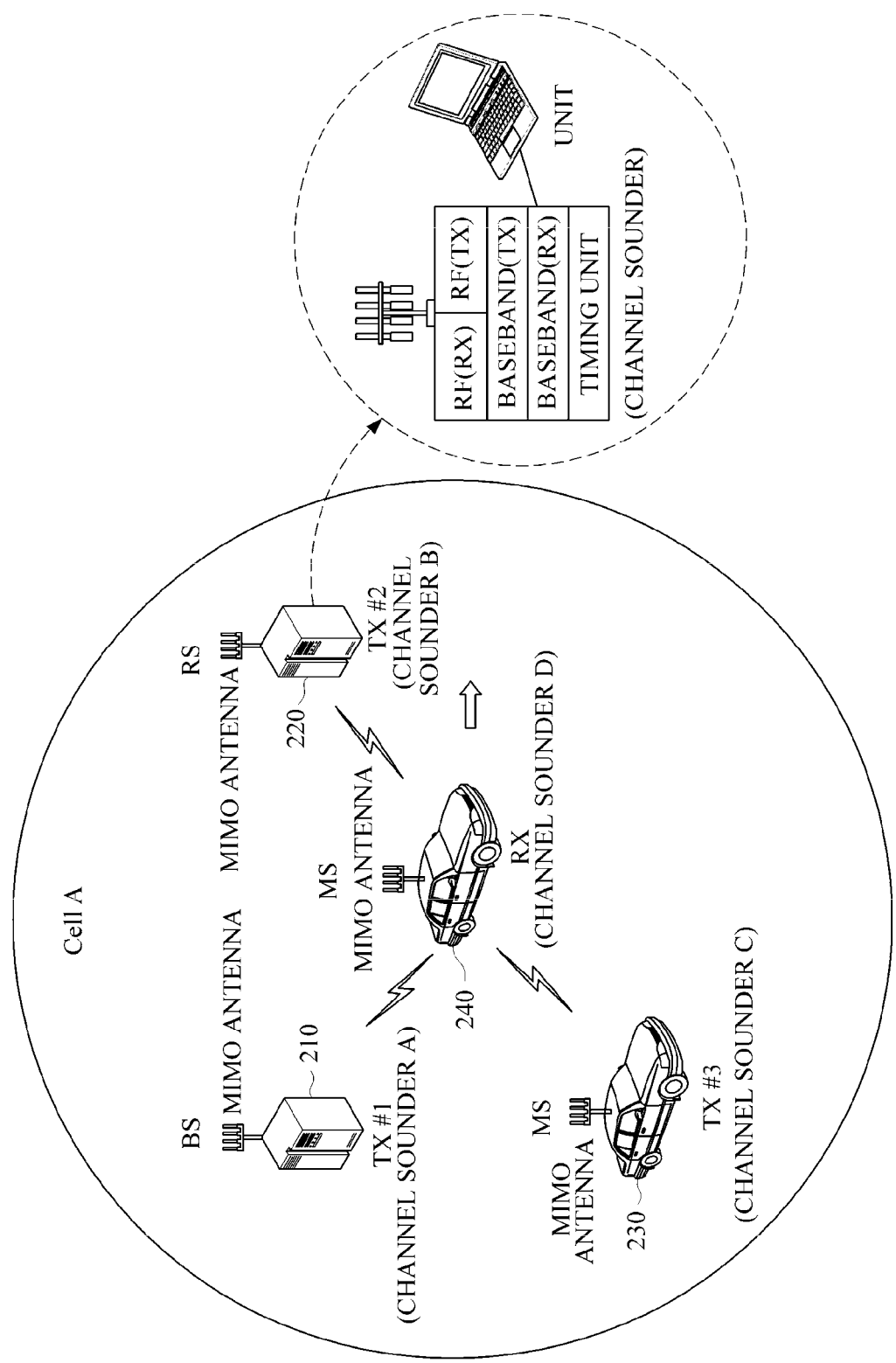
FIG. 2 is a diagram illustrating an example of performing wireless channel measurement in a complex communication network by using a multi-link wireless channel sounder.

FIG. 2 illustrates an example of installing a multi-link wireless channel sounder in a complex mobile communication network.

Referring to FIG. 2, in a mobile communication network in which multiple links exist, channel sounders A, B, C, and D for measuring multiple wireless channels for multiple links may be installed in a BS 210, an RS 220, and first and second MSs 230 and 240, respectively.

Channel sounders A, B, C, and D may be set easily to a TX mode or an RX mode, and may thus be able to serve as a TX or an RX accordingly. Channel sounders A, B, C, and D may be easy to drive. Accordingly, it is possible to efficiently measure wireless channels at reduced cost.

Referring to FIG. 2, the BS 210, the RS 220, and the first MS 230 may be set to a TX mode, and the second MS 240 may be set to an RX mode.

Whereas a typical wireless channel sounder simply measures the wireless channel for a single link between a BS and an MS, channel sounders A, B, C, and D may be configured to measure the wireless channels for at least two wireless links, including a first wireless channel $H_1$ for the link between the BS 210 and the second MS 240, a second wireless channel $H_2$ for the link between the RS 220 and the second MS 240, and a third wireless channel $H_3$ for the link between the first MS 230 and the second MS 240, in a time-division manner. Accordingly, it is possible to guarantee the precision and reliability of measurement of wireless channels and reduce the time and cost of measuring wireless channels.

Figure 3:
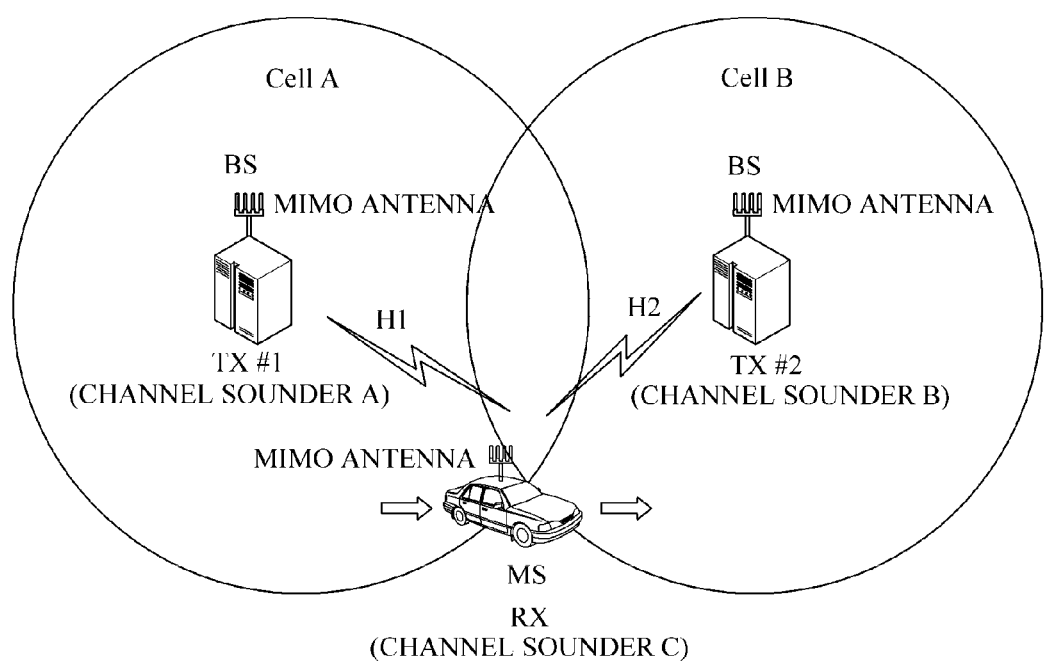
FIG. 3 is a diagram illustrating an example of performing wireless channel measurement during handover by using a multi-link wireless channel sounder.

FIG. 3 illustrates an example of measuring wireless channels during handover by using a multi-link wireless channel sounder. Referring to FIG. 3, to perform wireless channel measurement during handover, two channel sounders, i.e., channel sounders A and B, may be installed in a BS in a cell A and a BS in a cell B, respectively, and channel sounder C may be installed in an MS that moves from the cell A to the cell B and may measure a first wireless channel $H_1$ for the link in the cell A and a second wireless channel $H_2$ for a link in the cell B.

Various aspects are directed to designing a multi-link wireless channel sounder to be capable of measuring multiple links and improving the reliability of wireless channel measurement data that is collected using the multi-link wireless channel sounder.

Figure 4:
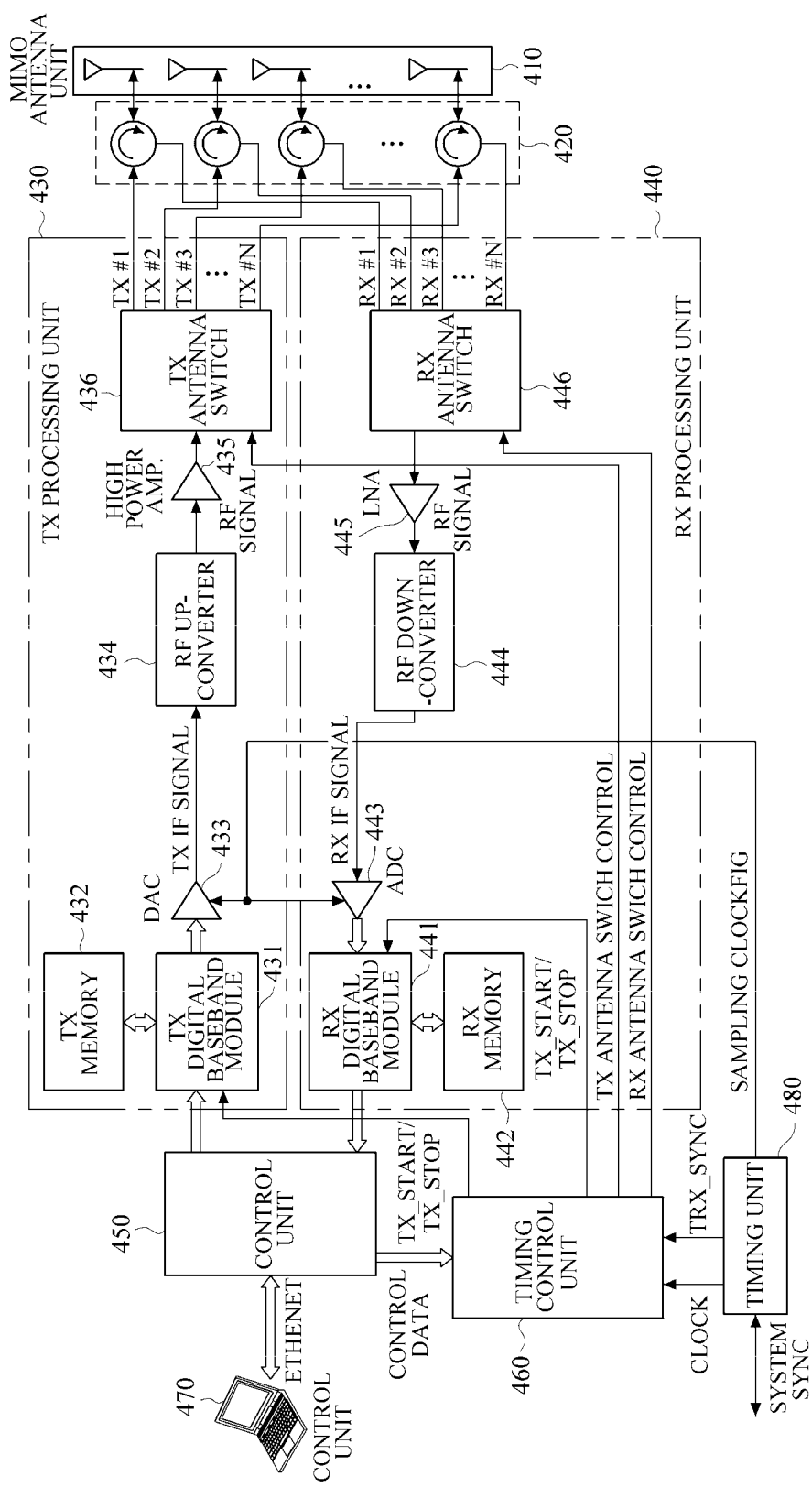
FIG. 4 is a diagram illustrating an example of a multi-link wireless channel sounder.

The structure and operation of an example of a multi-link wireless channel sounder, which is capable of measuring multiple wireless channels for multiple links at the same time and collecting and storing a large amount of wireless channel measurement data to analyze and model the wireless channel characteristics of a broadband multi-input multi-output (MIMO) mobile communication network environment (such as, for example, a cooperative mobile communication network environment) in which multiple complex links exist, the designing of one or more timing signals for the multi-link wireless channel sounder, and an operating method of the multi-link wireless channel sounder are described with reference to FIG. 4.

FIG. 4 illustrates an example of a multi-link wireless channel sounder.

Referring to FIG. 4, the multi-link wireless channel sounder includes a MIMO antenna unit 410, a TX processing unit 430, an RX processing unit 440, a central processing unit (CPU) 450, a timing control unit 460. The multi-link wireless channel sounder also includes a control unit 470, a timing unit (TIMU) 480, and a circulator unit 420.

The TX processing unit 430 may generate and transmit a TX channel signal to be measured by another multi-link wireless channel sounder. The TX processing unit 430 includes a TX digital baseband module 431, a TX memory 432, a digital-to-analog converter (DAC) 433, a radio frequency (RF) up-converter 434, a high-power amplifier 435, and a TX antenna switch 436.

The RX processing unit 440 may generate and store an RX channel signal to be measured. The RX processing unit 440 includes an RX digital baseband module 441, an RX memory 442, an analog-to-digital converter (ADC) 443, an RF down-converter 444, a low-noise amplifier (LNA) 445, and an RX antenna switch 446.

The CPU 450 may be connected to the control unit 470 such as, for example, a laptop computer, via the Ethernet, and may control the rest of the hardware of the multi-link wireless channel sounder in accordance with instructions given thereto by the control unit 470. For example, in response to a user input being received, the control unit 470 may select one of TX and RX modes so that the multi-link wireless channel sounder may operate in the selected mode. In this example, the control unit 470 may transmit a signal corresponding to the selected mode to the CPU 450 so that the operation and the timing of the operation of the rest of the multi-link wireless channel sounder may comply with the selected mode.

For example, in a case in which the multi-link wireless channel sounder is set as a TX, the CPU 450 may generate a digital probing signal (for example, code) for performing channel measurement, may transmit the digital probing signal to the TX digital baseband module 431, and may transmit channel measurement data that is received by the RX digital baseband module 441 to the control unit 470.

The TX digital baseband module 431 may receive the digital probing signal from the CPU 450, and may store the digital probing signal in the TX memory 432. The TX digital baseband module 431 may output the digital probing signal to the DAC 433 in accordance with a timing signal TX_START that is received from the timing control unit 460. The DAC 433 may convert the digital probing signal into a TX intermediate frequency (IF) analog signal, and may transmit the TX IF analog signal to the RF up-converter 434.

The RF up-converter 434 may convert the TX IF analog signal into a TX RF analog signal. The TX RF analog signal may be amplified by the high-power amplifier 435, and the amplified TX RF signal may be transmitted to the TX antenna switch 436.

The TX antenna switch 436 may include an input switching port and N output switching ports. The TX antenna switch 436 may transmit the amplified TX RF signal to the circulator unit 420 via a corresponding output switching port in accordance with a TX antenna switch control signal that is received from the timing control unit 460.

In a case in which the multi-link wireless channel sounder is set as an RX, the RX antenna switch 446, which includes N input switching ports and an output port, may select one of N RX analog signals that are received via the N input switching ports in accordance with an RX antenna switch control signal that is received from the timing control unit 460, and may output the selected RX analog signal to the LNA 445 via the output port.

The selected RF analog signal may be amplified by the LNA 445, and the amplified RF analog signal may be converted into an IF analog signal by the RF down-converter 444. The IF analog signal may be transmitted to the ADC 443. The ADC 443 may convert the IF analog signal into an IF digital signal by sampling the IF analog signal in accordance with a sampling clock that is received from the timing unit 480. The RX digital baseband module 441 may collect the IF digital signal, and may temporarily store the IF digital signal in the RX memory 442.

The TX antenna switch control signal and the RX antenna switch control signal may be generated by the timing control unit 460 for controlling antenna switching.

The MIMO antenna unit 410 may include N antennas. The circulator unit 420 may include N circulators respectively corresponding to the N antennas. In response to the multi-link wireless channel sounder being set as a TX or an RX, an RF signal may be transmitted or received via the circulator unit 420 and the MIMO antenna unit 410.

The TIMU 480 may precisely synchronize itself with the TIMU of another multi-link wireless channel sounder by using a system synchronization signal, may generate a TX/RX synchronization signal TRX_SYNC for synchronizing the transmission and reception of data by using the system synchronization signal, and may transmit the TX/RX synchronization signal TRX_SYNC to the timing control unit 460. The TIMU 480 may provide a clock and a sampling clock necessary for the operations of the TX processing unit 430 and the RX processing unit 440.

The timing control unit 460 may measure multiple wireless channels for multiple links. The structure and operation of the timing control unit 460 are further described with reference to FIG. 5.

Figure 5:
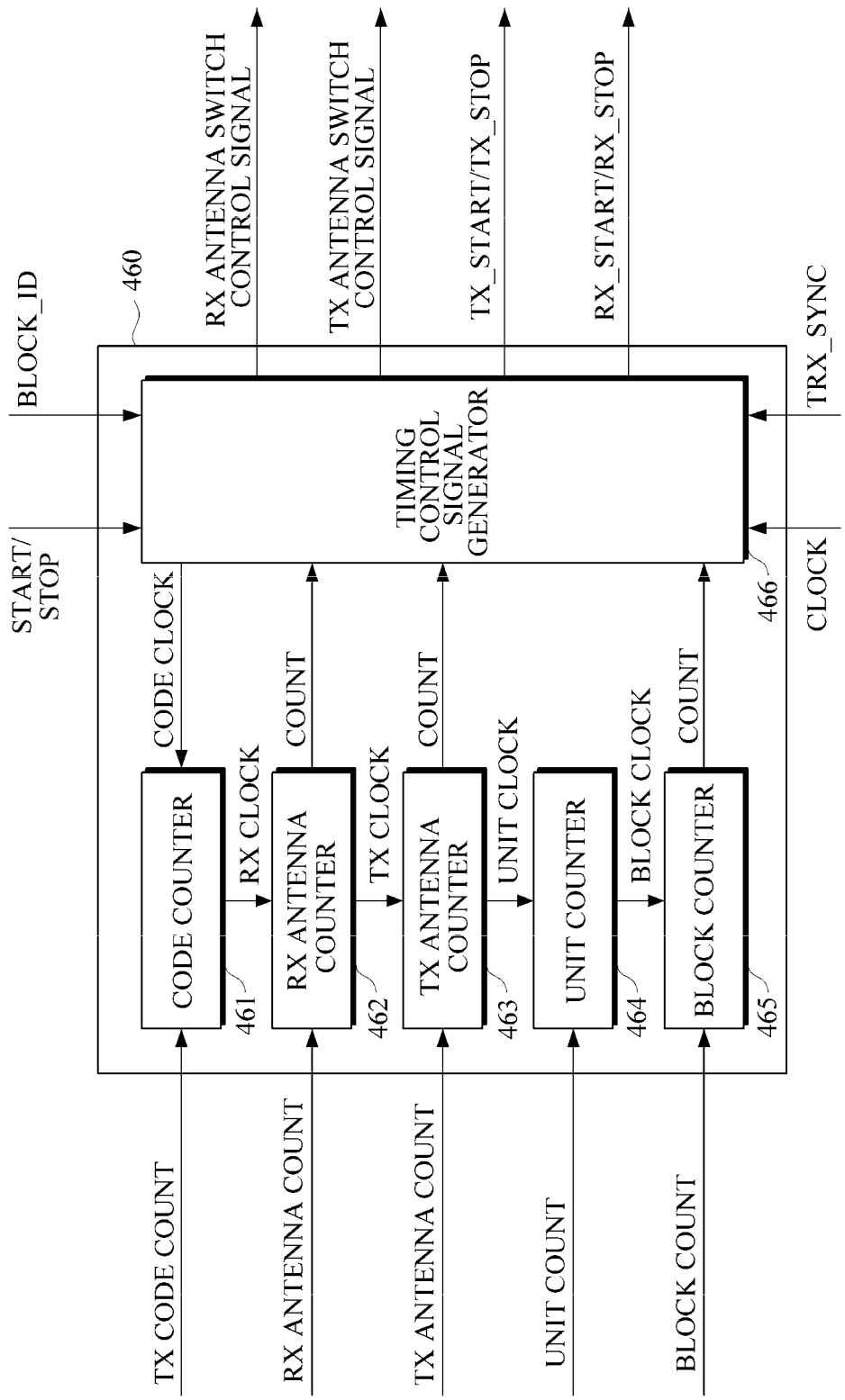
FIG. 5 is a diagram illustrating an example of a timing control block.

FIG. 5 illustrates an example of the timing control unit 460.

Referring to FIG. 5, the timing control unit 460 includes a code counter 461, an RX antenna counter 462, a TX antenna counter 463, a unit counter 464, a block counter 465, and a timing control signal generator 466.

In response to a user setting the multi-link wireless channel sounder illustrated in FIG. 4 as a TX or an RX via the CPU 450, the timing controller 460 may generate one or more TX timing control signals and one or more RX timing control signals based on control data regarding one or more timing variables that are set according to a TX or RX mode, and may provide the TX timing control signals and the RX timing control signals to the TX processing unit 430 and the RX processing unit 440, respectively.

For example, the timing variables include a TX code count, an RX antenna count, a TX antenna count, a unit count, a block count, and a block identifier (ID).

For example, the TX timing control signals and the RX timing control signals may include an RX antenna switch control signal, a TX antenna switch control signal, TX start and stop signals TX_START and TX_STOP, and RX start and stop signals RX_START and RX_STOP.

The code counter 461 may count a code clock signal that is provided by the timing control signal generator 466. For example, the code counter 461 may count a number of pulses of the code clock signal corresponding to a predefined number of TX codes, and may transmit the result of the counting to the RX antenna counter 462 as an RX clock signal. The RX antenna counter 462 may count the RX clock signal provided by the code counter 461. For example, the RX antenna counter 462 may count a number of RX clock pulses corresponding to a predefined number of RX antennas, and may transmit the result of the counting to the TX antenna counter 462 as a TX clock signal. The RX antenna counter 462 may transmit the TX clock signal to the timing control signal generator 466 so that the timing control signal generator 466 may generate the RX antenna switch control signal.

The TX antenna counter 463 may count the TX clock signal provided by the RX antenna counter 462. For example, the TX antenna counter 463 may count a number of TX clock pulses corresponding to a predefined number of TX antennas, and may transmit the result of the counting to the unit counter 464 as a unit clock signal. The TX antenna counter 463 may transmit the unit clock signal to the timing control signal generator 466 so that the timing control signal generator 466 may generate the TX antenna switch control signal.

The unit counter 464 may count the unit clock signal provided by the TX antenna counter 463. For example, the unit counter 464 may count a number of unit clock pulses corresponding to a predefined number of units, and may transmit the result of the counting to the block counter 465 as a block clock signal. The block counter 465 may count the block clock signal provided by the unit counter 464. For example, the block counter 465 may count a number of block clock pulses corresponding to a predefined number of blocks, and may transmit the result of the counting to the timing control signal generator 466.

The timing control signal generator 466 may generate the TX start and stop signals TX_START and TX_STOP and the RX start and stop signals RX_START and RX_STOP based on a block count provided by the block counter 465 and an input block ID.

The TX start and stop signals TX_START and TX_STOP may be input to the TX digital baseband module 431 illustrated in FIG. 4, and the RX start and stop signals RX_START and RX_STOP may be input to the RX digital baseband module 441 illustrated in FIG. 4. Accordingly, the multi-link wireless channel sounder illustrated in FIG. 4 may begin to perform a transmission or reception operation.

The definitions of and the timing relationship between the terms 'code,' 'unit,' and 'block,' and the timing relationship between the TX start and stop signals TX_START and TX_STOP, the RX start and stop signals RX_START and RX_STOP, and the operation of the multi-link wireless channel sounder illustrated in FIG. 4 are further described with reference to FIGS. 6 and 7.

Figure 6:
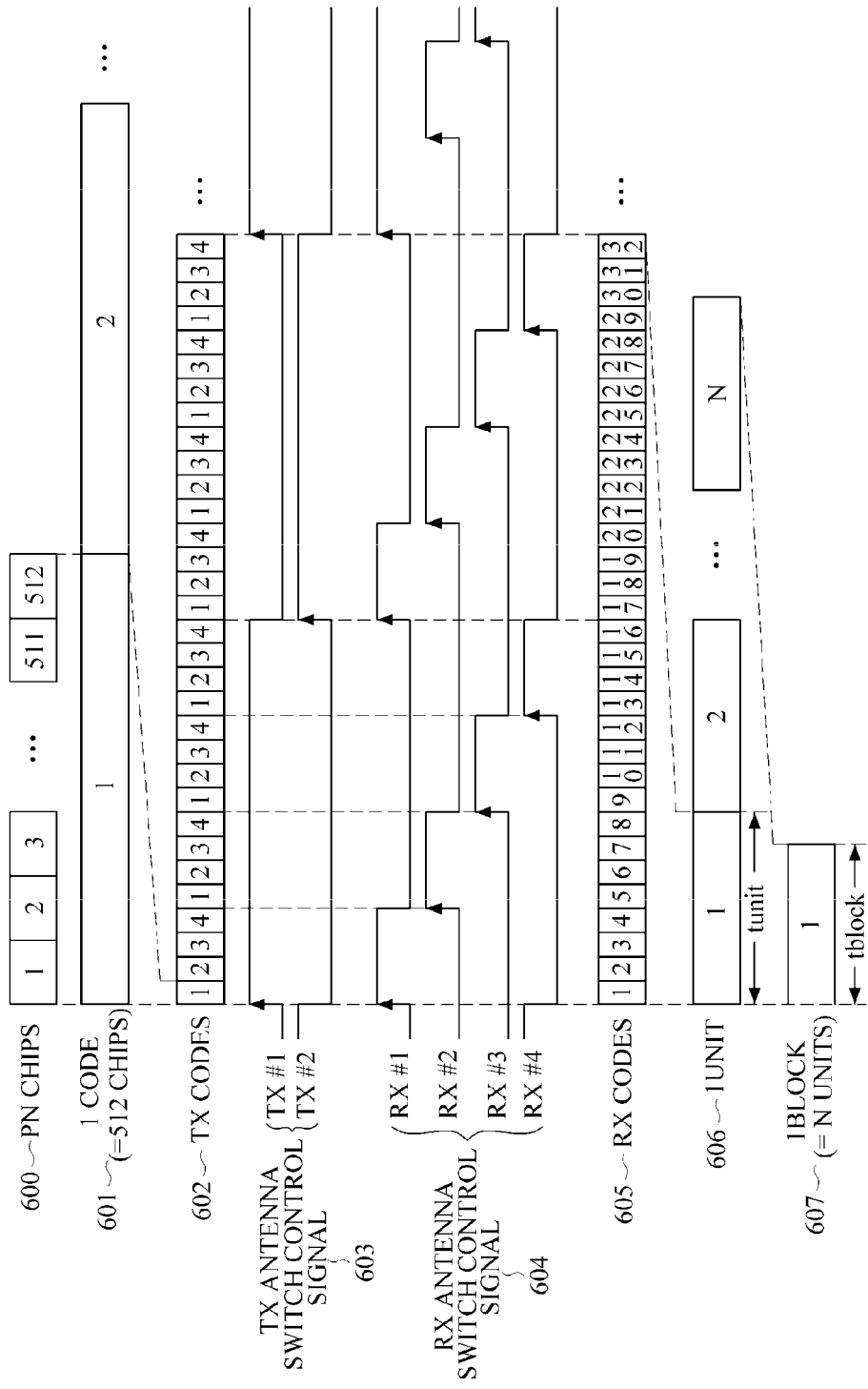
FIG. 6 is a diagram illustrating an example of the timing of a digital probing signal for performing wireless channel measurement.

FIG. 6 illustrates an example of the timing of a digital probing signal for performing channel measurement.

As described above, the CPU 450 illustrated in FIG. 4 may transmit control data, which includes the values of timing variables, to the timing control unit 460. The timing of the control data in accordance with the number of TX codes, the number of RX antennas, the number of TX antennas, the number of units, and the number of blocks is as illustrated in FIG. 6.

Referring to FIG. 6, PN chips 600 are a digital probing signal for performing channel measurement, and are widely used in typical wireless channel sounders. For example, assume that the combined length of the PN chips 600 is 512.

Basic codes 601 are the unit of measurement of wireless channel measurement, and each of the basic codes 601 may be 512 PN chips long. TX Codes 602 are codes that are transmitted for wireless channel measurement, and may be repetitions of the basic codes 601.

For example, assume that there are 4 TX codes, 4 RX antennas, 2 TX antennas, and N units.

In a case in which there are 2 TX antennas (i.e., first and second TX antennas TX #1 and TX #2) and 4 RX antennas (i.e., first through fourth RX antennas RX #1 through RX #4) in a multi-link wireless channel sounder, the timing of the switching of the first and second TX antennas TX #1 and TX #2 may be as indicated by a TX antenna switch control signal 603, and the timing of the switching of the first through fourth RX antennas RX #1 through RX #4 may be as indicated by an RX antenna switch control signal 604.

For example, the first through fourth RX antennas RX #1 through RX #4 may be sequentially switched on according to the RX antenna switch control signal 604, and the time that it takes to switch on all the first through fourth RX antennas RX #1 through RX #4 may be the same as the time that it takes to switch on the first TX antenna TX #1. During the switching of the second TX antenna TX #2, the first through fourth RX antennas RX #1 through RX #4 may also be sequentially switched on. The amount of time that it takes to switch on each of the first through fourth RX antennas RX #1 through RX #4 may be determined by the number of TX codes. For example, if there are 4 TX codes, the amount of time that it takes to switch on each of the first through fourth RX antennas RX #1 through RX #4 may be four times the length of each of the 4 TX codes.

For example, if a bandwidth to be measured is 100 MHz, the switching timing of the TX antenna switch control signal 603 and the switching time of the RX antenna switch control signal 604 may be defined as follows:

(Time of 1 Code)=(Length of $PN$ Chips)×(1/Bandwidth)=512×10 ns=5.12 us (Switching Time of $RX$ Antenna Switch Control Signal)=(Time of 1 Code)×($TX$ Code Count)=5.12 us×4=20.48 us (Switching Time of $TX$ Antenna Switch Control Signal)=($RX$ Antenna Count)×($RX$ Antenna Count)= 4×20.48 us=81.92 us.

Referring to FIG. 6, the combined length of RX codes 605 may correspond to 1 unit, which is the unit amount of data that can be received by a multi-link wireless channel sounder when all of the TX and RX antenna switch control signals are alternately transmitted and received. A length tunit (in time) of 1 unit may be calculated using the following equation:

$t$unit=($TX$ Antenna Count)×(Switching Time of $TX$ Antenna Switch Control Signal)=2×81.92 us=163.84 us.

If there are N units, the N units may form a block 607. For example, if N=4, a length tblock (in time) of the block 607 may be calculated using the following equation:

$t$block=(Unit Count)×$t$unit=4×163.84 us=655.36 us.

Figure 7:
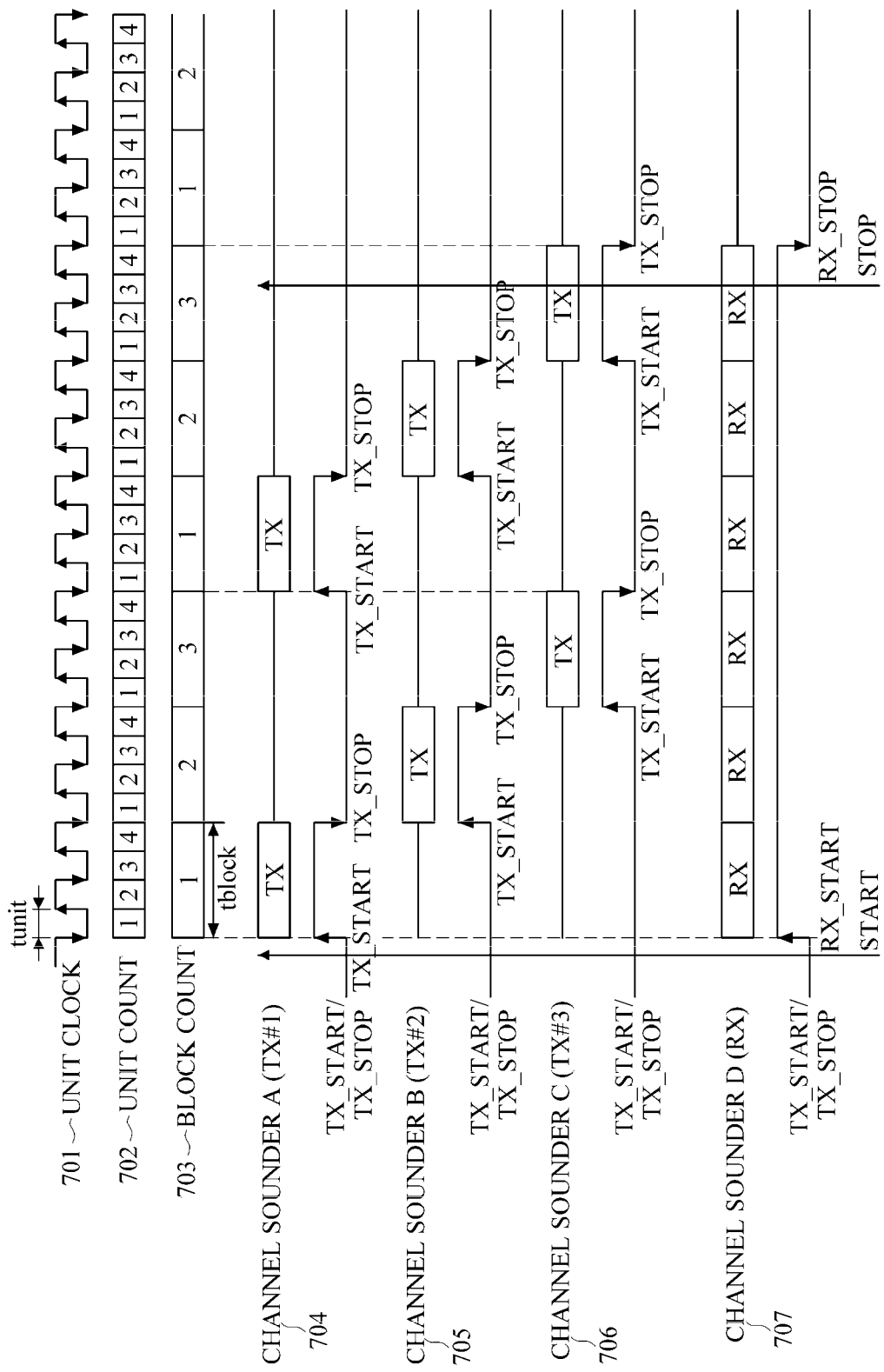
FIG. 7 is a diagram illustrating an example of the timing of an operation of a multi-link wireless channel sounder.

FIG. 7 illustrates an example of the timing of the operation of a multi-link wireless channel sounder, and particularly, an example of the timing of the operations of channel sounders A, B, C, and D in accordance with the timing variables illustrated in FIG. 6. For example, assume that channel sounders A, B, and C are set in a TX mode, and that channel sounder D is set in an RX mode.

Referring to FIG. 7, a unit clock 701 may be a timing signal that is generated by the timing control unit 460 illustrated in FIG. 4. For example, one or more timing variables may be set to be equal for all channel sounders A, B, C, and D so that channel sounders A, B, C, and D may generate the same timing clock.

For example, the combined length of PN chips, the number of TX codes, the number of RX antennas, the number of TX antennas, the number of units, and the number of blocks may be set to be equal for all channel sounders A, B, C, and D. For example, referring to FIG. 7, the number of blocks may be 3, which is the same as the number of channel sounders that are set as TXs. The block IDs of channel sounders A, B, C, and D may be set as follows:

Block ID of Channel Sounder A=1
Block ID of Channel Sounder B=2
Block ID of Channel Sounder C=3
Block ID of Channel Sounder D=3.

Referring to FIG. 7, in response to a TX start signal TX_START, which is generated by the timing control unit 460 illustrated in FIG. 4 based on a start signal START, being input to channel sounder A (704, TX #1) first according to the order of the block IDs of channel sounders A, B, and C, channel sounder A may emit a probing signal for a predefined amount of time tblock. In response to a TX stop signal TX_STOP signal being input to channel sounder A, channel sounder A may stop emitting the probing signal.

In response to the TX start signal TX_START being input to channel sounder B (705, TX #2) according to the order of the block IDs of channel sounders A, B, C, and D, channel sounder B may emit a probing signal for the predefined amount of time tblock. In response to the TX stop signal TX_STOP signal being input to channel sounder B, channel sounder B may stop emitting the probing signal.

In response to the TX start signal TX_START being input to channel sounder C (706, TX #3) according to the order of the block IDs of channel sounders A, B, C, and D, channel sounder C may emit a probing signal for the predefined amount of time tblock. In response to the TX stop signal TX_STOP signal being input to channel sounder C, channel sounder C may stop emitting the probing signal.

Channel sounders A, B, and C may perform the above-mentioned operations, i.e., emitting a probing signal and stopping emitting the probing signal, repeatedly until a stop signal STOP is received.

In response to an RX start signal RX_START, which is generated by the timing control unit 460 illustrated in FIG. 4 based on the start signal START, channel sounder D (707, RX) may sequentially measure the wireless channels for the wireless inks from channel sounders A, B, and C for the predefined amount of time tblock, respectively, and may collect the results of the measurement.

Channel sounder D may perform the above-mentioned operations as many times as designated by the block ID thereof until an RX stop signal RX_STOP is received.

Channel sounders A, B, C, and D may generate the same timing clock, and may thus be synchronized with each other by a TX/RX synchronization signal TRX_SYNC. For example, referring to FIG. 4, the TX/RX synchronization signal TRX_SYNC may be generated by the TIMU 480, and may be provided to the timing control unit 460. Accordingly, the TIMUs of channel sounders A, B, C, and D may be able to provide synchronized signals to each other through system synchronization.

Examples of performing multi-link wireless channel measurement in a complex mobile communication network are described with reference to FIGS. 8 and 9.

Figure 8:
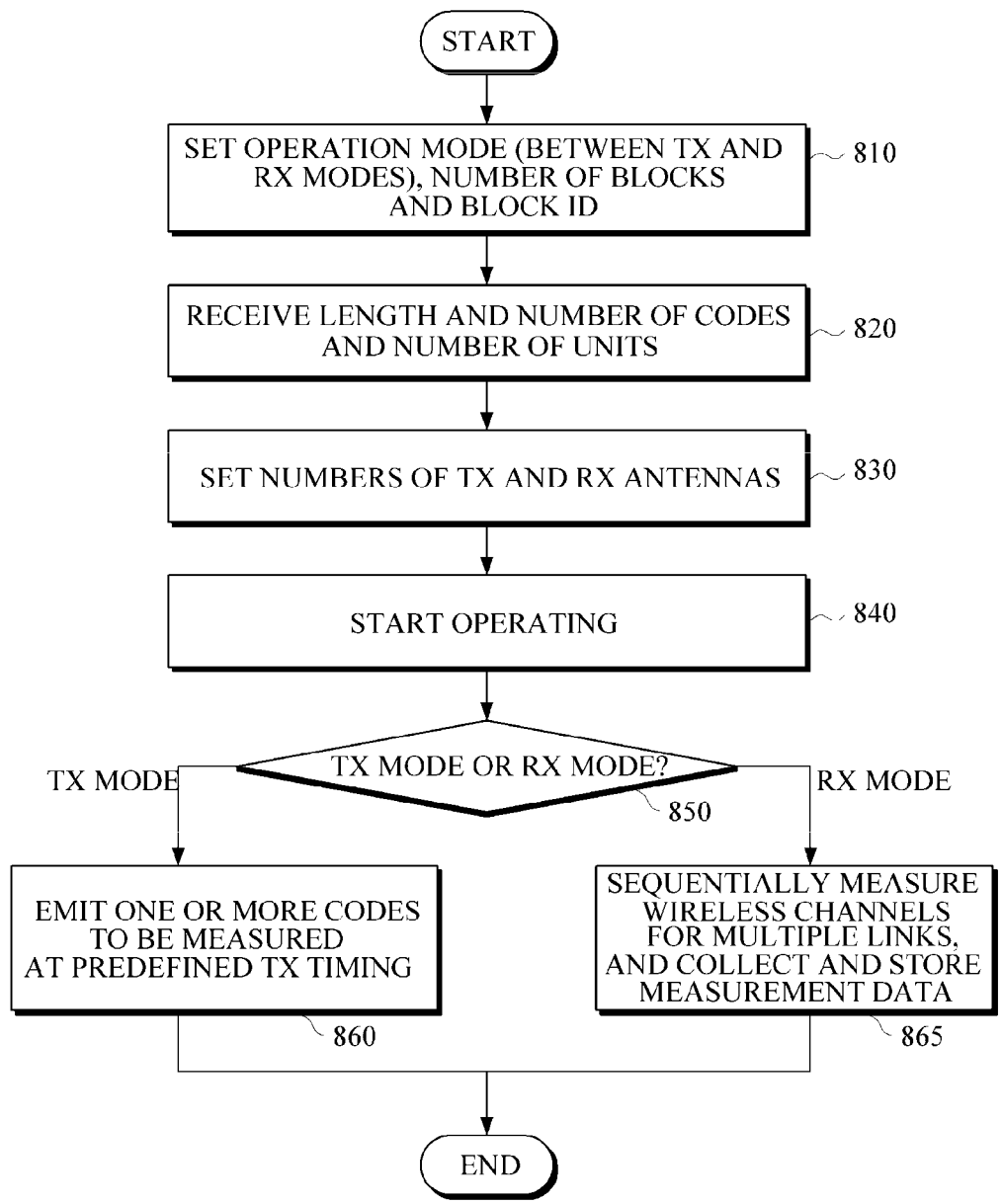
FIG. 8 is a flowchart illustrating an example of a method of measuring multiple wireless channels for multiple links.

FIG. 8 illustrates an example of a multi-link wireless channel measurement method. For example, assume that two or more multi-link wireless channel sounders that are equipped with MIMO antennas of the same type are installed as a TX and an RX, respectively, according to a plan for measuring target wireless links.

Referring to FIG. 8, in 810, each of the two multi-link wireless channel sounders may be set as a TX or an RX in response to an operation mode selection signal being received from a user via their control units 470. The two multi-link wireless channel sounders may be provided with block IDs and a block quantity that is determined by the number of target links to be measured via their control units 470.

In 820, the two multi-link wireless channel sounders may be provided with the length of codes, the number of codes, and the number of units by the user via their control units 470. In 830, the two multi-link wireless channel sounders may be provided with the number of TX MIMO antennas and the number of RX MIMO antennas by the user via their control units 470.

Data that is input to the two multi-link wireless channel sounders in 820 and 830 may be the same as data that is input to other multi-link wireless channel sounders.

In 840, the two multi-link wireless channel sounders may begin to operate. For example, the two multi-link wireless channel sounders may begin to operate according to the timing illustrated in FIG. 7. The generation of a timing control signal is further described with reference to FIG. 9.

Referring to FIG. 8, in 850, in response to an operation start signal being received, each of the two multi-link wireless channel sounders may identify their operation modes that are set in 810.

In 860, in a case in which the two multi-link wireless channel sounders are determined to be set as TXs, the two multi-link wireless channel sounders may transmit in turn one or more codes to be measured according to their block IDs.

In 865, in a case in which the two multi-link wireless channel sounders are determined to be set as RXs, the two multi-link wireless channel sounders may perform wireless channel measurement in turn according to their block IDs, and may collect and store a large amount of wireless channel measurement data.

Figure 9:
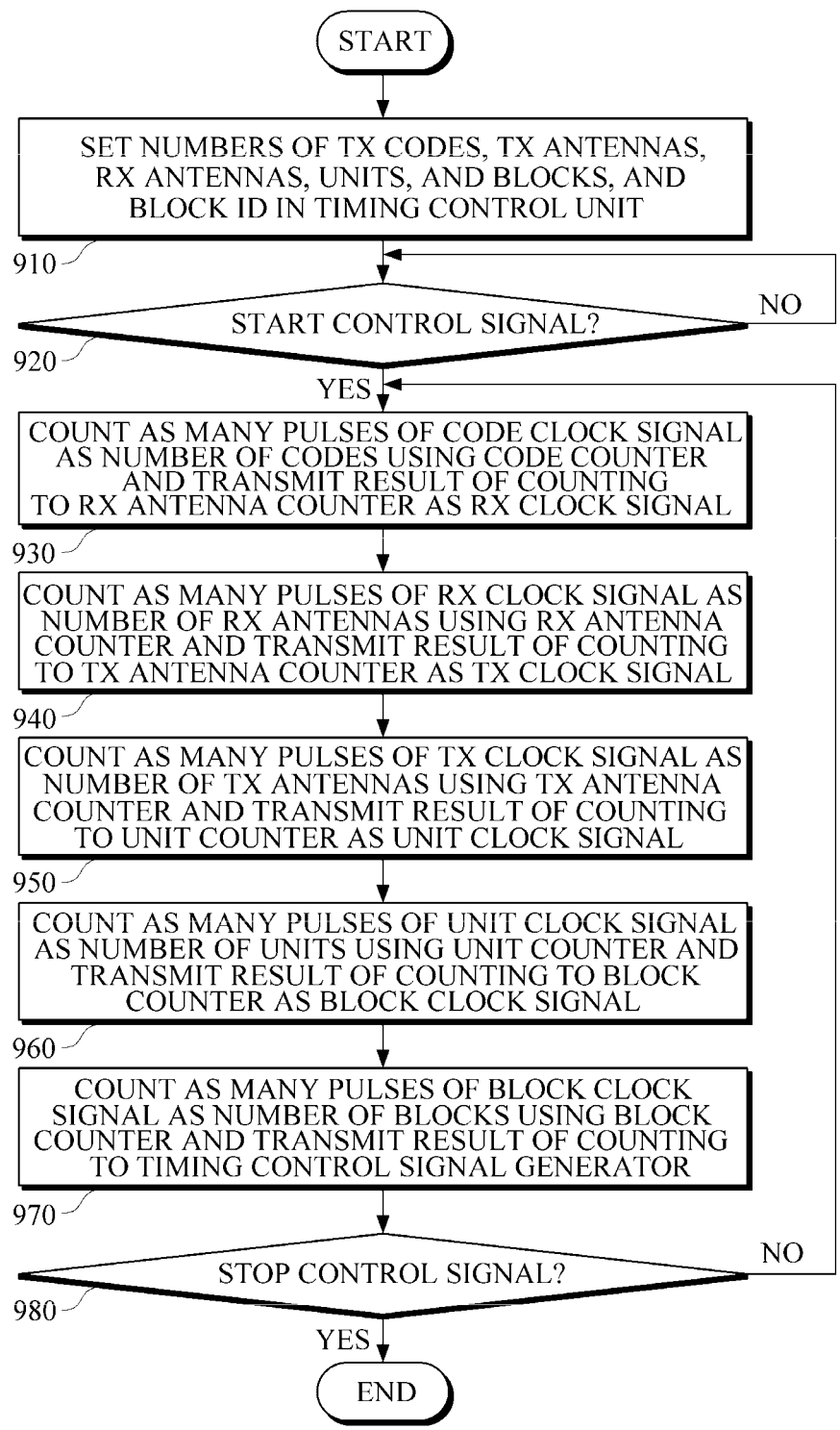
FIG. 9 is a flowchart illustrating an example of a method of generating a timing control signal for measuring multiple wireless channels for multiple links.

FIG. 9 illustrates an example of a method of generating a timing control signal for performing multi-link wireless channel measurement, and more particularly, an example of the generation of one or more timing control signals by the timing control unit 460 illustrated in FIG. 4.

Referring to FIG. 9, in 910, the number of TX codes, the number of TX antennas, the number of RX antennas, the number of units, the number of blocks, and a block ID that are received in 820 and 830 may be set in the timing control unit 460.

In 930, in response to a start control signal being generated in 920, the code counter 461 of the timing control unit 460 may count a number of pulses of a code clock signal corresponding to the number of TX codes, and may transmit the result of the counting to the RX antenna counter 462 as an RX clock signal.

In 940, the RX antenna counter 462 may count a number of pulses of the RX clock signal corresponding to the number of RX antennas, and may transmit the result of the counting to the TX antenna counter 463 as a TX clock signal. In 950, the TX antenna counter 463 may count a number of pulses of the TX clock signal corresponding to the number of TX antennas, and may transmit the result of the counting to the unit counter 464 as a unit clock signal. In 960, the unit counter 464 may count a number of pulses of the unit clock signal corresponding to the number of units, and may transmit the result of the counting to the block counter 465 as a block clock signal.

In 970, the block counter 465 may count a number of pulses of the block clock signal corresponding to the number of blocks, and may transmit a count value obtained by counting the block clock signal to the timing control signal generator 466. For example, in response to the multi-link wireless channel sounder illustrated in FIG. 4 being set as a TX, the timing control signal generator 466 may generate a TX timing control signal (i.e., TX_START or TX_STOP) based on the count value provided by the block counter 465. For example, in response to the multi-link wireless channel sounder illustrated in FIG. 4 being set as an RX, the timing control signal generator 466 may generate an RX timing control signal (i.e., RX_START or RX_STOP) based on the count value provided by the block counter 465.

In 980, in response to a stop control signal being received from the user via the control unit 470, the method ends. In 980, in response to no stop control signal being received, the method returns to 930.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As described above, it is possible to reduce the time and cost of wireless channel measurement by performing wireless channel measurement for multiple links at the same time.

In addition, it is possible to improve the precision and reliability of wireless channel measurement data.

Moreover, it is possible to use a wireless channel sounder as a TX or an RX by setting the operation mode of the wireless channel sounder to a TX mode or an RX mode. Therefore, it is possible to facilitate the operation of the wireless channel sounder and reduce the time and cost of wireless channel measurement.

Furthermore, it is possible to perform wireless channel measurement for two or more links including links between a BS and an MS, between an RS and an MS, and between one MS and another MS. Therefore, it is possible to further improve the precision and reliability of wireless channel measurement data and reduce the time and cost of wireless channel measurement.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-link wireless channel sounder, comprising:
a multi-input multi-output (MIMO) antenna unit;
a transmitter (TX) signal processing unit configured to transmit via the MIMO antenna unit two or more TX wireless channel signals at a predefined TX timing synchronized with two or more other multi-link wireless channel sounders;
a receiver (RX) signal processing unit configured to receive and process two or more RX wireless channel signals at a predefined RX timing synchronized with two or more other multi-link wireless channel sounders, the two or more RX wireless channel signals being received from multiple links wirelessly connected to two or more other multi-link wireless channel sounders via the MIMO antenna unit; and
a control unit configured to receive an operation mode selection signal that indicates a TX mode or an RX mode from a user and to control the TX signal processing unit or the RX signal processing unit to operate selectively in one or the other of the TX mode or the RX mode in accordance with the operation mode selection signal,
wherein the timing control unit comprises:
a code counter configured to count a code clock signal that is received from the outside of the multi-link wireless channel sounder and to transmit a count value obtained by counting the code clock signal to an RX antenna counter as an RX clock signal;
the RX antenna counter configured to count a number of pulses of the RX clock signal corresponding to a predefined number of RX antennas and to transmit a count value obtained by counting the RX clock signal to a TX antenna counter as a TX clock signal;
the TX antenna counter configured to count a number of pulses of the TX clock signal corresponding to a predefined number of TX antennas and to transmit a count value obtained by counting the TX clock signal to a unit counter as a unit clock signal;
the unit counter configured to count a number of pulses of the unit clock signal corresponding to a predefined number of units and to transmit a count value obtained by counting the unit clock signal to a block counter as a block clock signal;
the block counter configured to count a number of pulses of the block clock signal corresponding to a predefined number of blocks and to transmit a count value obtained by counting the block clock signal to a timing control signal generator; and
the timing control signal generator configured to generate TX start and stop signals and RX start and stop signals based on the count value provided by the block counter and an input block identifier (ID) and output the TX start and stop signals and the RX start and stop signals.

2. The multi-link wireless channel sounder of claim 1, further comprising:
a timing unit configured to generate a TX synchronization signal and an RX synchronization signal for synchronizing the multi-link wireless channel sounder with two or more other multi-link wireless channel sounders and to provide the TX synchronization signal and the RX synchronization signal to the timing control unit.

3. The multi-link wireless channel sounder of claim 1, wherein the control unit is further configured to receive a control variable signal and one of a TX mode selection signal or an RX selection signal from the user.

4. The multi-link wireless channel sounder of claim 1, wherein the control unit is further configured to, in response to the TX mode selection signal being received from the user, generate a digital probing signal for performing wireless channel measurement and transmit the digital probing signal to the TX signal processing unit.

5. The multi-link wireless channel sounder of claim 1, wherein the control unit is further configured to, in response to the RX mode selection signal being received from the user, sequentially measure a plurality of wireless channel signals for a plurality of links that are received by the RX signal processing unit.

6. The multi-link wireless channel sounder of claim 1, wherein the TX signal processing unit comprises:
  a TX memory;
  a TX digital baseband module configured to store the digital probing signal in the TX memory and output the digital probing signal in response to a timing signal being received from the timing control unit;
  a digital-to-analog converter (DAC) configured to convert the digital probing signal into a TX intermediate frequency (IF) analog signal and output the TX IF analog signal;
  a radio frequency (RF) up-converter configured to convert the TX IF analog signal into a TX RF signal;
  a high-power amplifier configured to amplify the TX RF signal and output the amplified TX RF signal; and
  a TX antenna switch configured to include one input switching port and a plurality of output switching ports and to output the TX RF signal via one of the output switching ports in response to a TX antenna switch control signal being received from the timing control unit.

7. The multi-link wireless channel sounder of claim 1, wherein the RX signal processing unit comprises:
  an RX antenna switch configured to include a plurality of input switching ports and one output switching port and to, in response to an RX antenna switch control signal being received from the timing control unit, select one of a plurality of RF signals that are received via the input switching ports and transmit the selected RF signal via the output switching port;
  a low-noise amplifier configured to amplify the selected RF signal and output the amplified RF signal;
  an RF down-converter configured to convert the amplified RF signal into an IF analog signal;
  an analog-to-digital converter (ADC) configured to convert the IF analog signal into a digital signal by sampling the IF analog signal in accordance with a sampling clock that is received from the timing unit;
  an RX memory; and
  an RX digital baseband module configured to collect the digital signal from the ADC and temporarily store the digital signal in the RX memory.

8. The multi-link wireless channel sounder of claim 1, further comprising:
  a plurality of circulators configured to respectively correspond to a plurality of antennas that are included in the MIMO antenna unit and to transmit or receive one or more RF signals in response to the multi-link wireless channel sounder being set to the TX or RX mode.

9. The multi-link wireless channel sounder of claim 1, wherein the timing control signal generator is further configured to generate an RX antenna switch control signal and transmit the RX antenna switch control signal to the RX antenna switch or to generate a TX antenna switch control signal and transmit the TX antenna switch control signal to the TX antenna switch.

10. The multi-link wireless channel sounder of claim 1, wherein the RX antenna switch control signal sequentially switches on a plurality of RX antennas and an amount of time that it takes to switch on all the plurality of RX antennas is the same as an amount of time that it takes to receive data via a TX antenna.

11. A wireless channel measurement method of a multi-link wireless channel sounder that selectively operates in one of a TX mode or an RX mode at a given time, the wireless channel measurement method comprising:
  setting the multi-link wireless channel sounder to the TX mode in response to a control signal received from a user; and
  transmitting two or more codes to be measured to another multi-link wireless channel sounder that is set to the RX mode at a predefined TX timing synchronized with two or more other multi-link wireless channel sounders,
  wherein, in the TX mode, the wireless channel sounder generates a digital probing signal for performing wireless channel measurement and transmits the digital probing signal to the TX signal processing unit, and in the RX mode, the wireless channel sounder sequentially measures a plurality of wireless channel signals for a plurality of links that are received by the RX signal processing unit,
  a code counter in the wireless channel sounder counts a code clock signal that is received from outside the multi-link wireless channel sounder and transmits a count value obtained by counting the code clock signal to an RX antenna counter in the wireless channel sounder as an RX clock sounder,
  the RX antenna counter counts a number of pulses of the RX clock signal corresponding to a predefined number of RX antennas and transmits a count value obtained by counting the RX clock signal to a TX antenna counter as a TX clock signal,
  the TX antenna counter counts a number of pulses of the TX clock signal corresponding to a predefined number of TX antennas and transmits a count value obtained by counting the TX clock signal to a unit counter as a unit clock signal,
  the unit counter counts a number of pulses of the unit clock signal corresponding to a predefined number of units and transmits a count value obtained by counting the unit clock signal to a block counter as a block clock signal,
  the block counter counts a number of pulses of the block clock signal corresponding to a predefined number of blocks and transmits a count value obtained by counting the block clock signal to a timing control signal generator, and
  the timing control signal generator generates TX start and stop signals and RX start and stop signals based on the count value provided by the block counter and an input block identifier (ID) and outputs the TX start and stop signals and the RX start and stop signals.

12. The wireless channel measurement method of claim 11, wherein the setting the multi-link wireless channel sounder to the TX mode comprises allocating a block ID, which indicates when to transmit data, to the multi-link wireless channel sounder and the predefined TX timing is determined by the block ID.

13. The wireless channel measurement method of claim 11, further comprising:
    setting one or more timing variables for synchronizing the multi-link wireless channel sounder with other multi-link wireless channel sounders.

14. The wireless channel measurement method of claim 13, wherein the timing variables are set to be equal for the multi-link wireless channel sounder and other multi-link wireless channel sounders and include a length of codes, a number of codes, a number of units, a number of TX antennas, and a number of RX antennas.

15. A wireless channel measurement method of a multi-link wireless channel sounder that selectively operates in one of a TX mode or an RX mode at a given time, the wireless channel measurement method comprising:
    setting the multi-link wireless channel sounder to the RX mode in response to a control signal being received from a user; and
    receiving and processing two or more RX wireless channel at a predefined RX timing synchronized with two or more other multi-link wireless channel sounders, that are received from multiple links wirelessly connected to two or more other multi-link wireless channel sounders,
    wherein, in the TX mode, the wireless channel sounder generates a digital probing signal for performing wireless channel measurement and transmits the digital probing signal to the TX signal processing unit,
    in the RX mode, the wireless channel sounder sequentially measures a plurality of wireless channel signals for a plurality of links that are received by the RX signal processing unit
    a code counter in the wireless channel sounder counts a code clock signal that is received from outside the multi-link wireless channel sounder and transmits a count value obtained by counting the code clock signal to an RX antenna counter in the wireless channel sounder as an RX clock sounder,
    the RX antenna counter counts a number of pulses of the RX clock signal corresponding to a predefined number of RX antennas and transmits a count value obtained by counting the RX clock signal to a TX antenna counter as a TX clock signal,
    the TX antenna counter counts a number of pulses of the TX clock signal corresponding to a predefined number of TX antennas and transmits a count value obtained by counting the TX clock signal to a unit counter as a unit clock signal,
    the unit counter counts a number of pulses of the unit clock signal corresponding to a predefined number of units and transmits a count value obtained by counting the unit clock signal to a block counter as a block clock signal,
    the block counter counts a number of pulses of the block clock signal corresponding to a predefined number of blocks and transmits a count value obtained by counting the block clock signal to a timing control signal generator, and
    the timing control signal generator generates TX start and stop signals and RX start and stop signals based on the count value provided by the block counter and an input block identifier (ID) and outputs the TX start and stop signals and the RX start and stop signals.

16. The wireless channel measurement method of claim 15, wherein the setting the multi-link wireless channel sounder to the RX mode comprises allocating a block ID to each of the two or more other multi-link wireless channel sounders.

17. The wireless channel measurement method of claim 15, further comprising:
    setting one or more timing variables for synchronizing the multi-link wireless channel sounder with other multi-link wireless channel sounders.

* * * * *